March 17, 1964 G. E. NASLUND ETAL 3,124,955
METHOD AND MEANS FOR DETERMINING ADHERENCE
OF A COATING BONDED TO A SURFACE
Filed Feb. 15, 1960 2 Sheets-Sheet 1

INVENTORS.
GLEN E. NASLUND
BRUCE O. HALLBERG
BY
ATTORNEY

March 17, 1964  G. E. NASLUND ETAL  3,124,955
METHOD AND MEANS FOR DETERMINING ADHERENCE
OF A COATING BONDED TO A SURFACE
Filed Feb. 15, 1960  2 Sheets-Sheet 2

INVENTORS.
GLEN E. NASLUND
BRUCE O. HALLBERG
BY
Leslie G. Noller
ATTORNEY

United States Patent Office 3,124,955
Patented Mar. 17, 1964

3,124,955
METHOD AND MEANS FOR DETERMINING ADHERENCE OF A COATING BONDED TO A SURFACE
Glen E. Naslund and Bruce O. Hallberg, Longview, Wash., assignors to Weyerhaeuser Company, Tacoma, Wash., a corporation of Washington
Filed Feb. 15, 1960, Ser. No. 8,563
4 Claims. (Cl. 73—150)

This invention relates to a method and means for determining the adherence of coatings which have been applied to various surfaces such as wood, metal, plastic, and the like.

Several tests have been proposed and some are in operation in the industry for determining the adherence of a coating applied to a surface among which are the crosshatch test and the knife test. Another test devised employs the stripping of an adhesive tape from a coated surface and visually judging the amount of the coating remaining attached to the surface.

None of these tests has been entirely satisfactory being complicated or subjective and dependent upon the skills of the operators, which vary, producing inaccurate and inconsistent results. Where adhesive tape is employed, results vary depending upon the pressure applied to the tape in application and also with the speed employed in stripping it from the coated surface.

It is, therefore, the object of this invention to provide a method and means for providing an accurate, reliable measurement of the adherence of a coating applied to a surface.

Another object of this invention is to provide an adherence tester which, although simple in construction and ease of operation, is highly accurate in measuring and recording the adherence of a coating applied to a surface.

A further object is to provide a method and means for determining the adherence of a coating applied to a surface which employs the removal of an adhesive tape from the coated surface without dependence upon the the subjective observations of highly skilled operators to give accurate and reproducible measurements.

In the present embodiment of the invention, the adherence tester includes the modification of a pendulum type impact tester to provide a means for supporting a surface coated article having an adhesive tape firmly in contact therewith, means for attaching an extended portion of the tape within the path of the arc described by the pendulum, and means for recording the residual energy of the pendulum.

More specifically, an adhesive tape is applied with a predetermined pressure to the coated surface of an article, means are provided for holding the said article in a position adjacent the path described by a free falling pendulum, associated means are provided for holding an extended portion of the adhesive tape at the zero position of the arc described by the falling pendulum, and means provided for engaging and carrying said tape holding means by said pendulum thereby removing the tape from the said surface coated article, and means provided for recording the residual energy of the pendulum.

For the purpose of illustrating and more clearly describing the present invention, reference is made to the testing of the adherence of a paint film to the surface of a fiberboard or, more specifically, to a heat and pressure consolidated fiberboard known in the industry as hardboard. Other objects and advantages will be readily apparent from the following detailed description when considered with further reference to the accompanying drawing, wherein.

Figure 1:
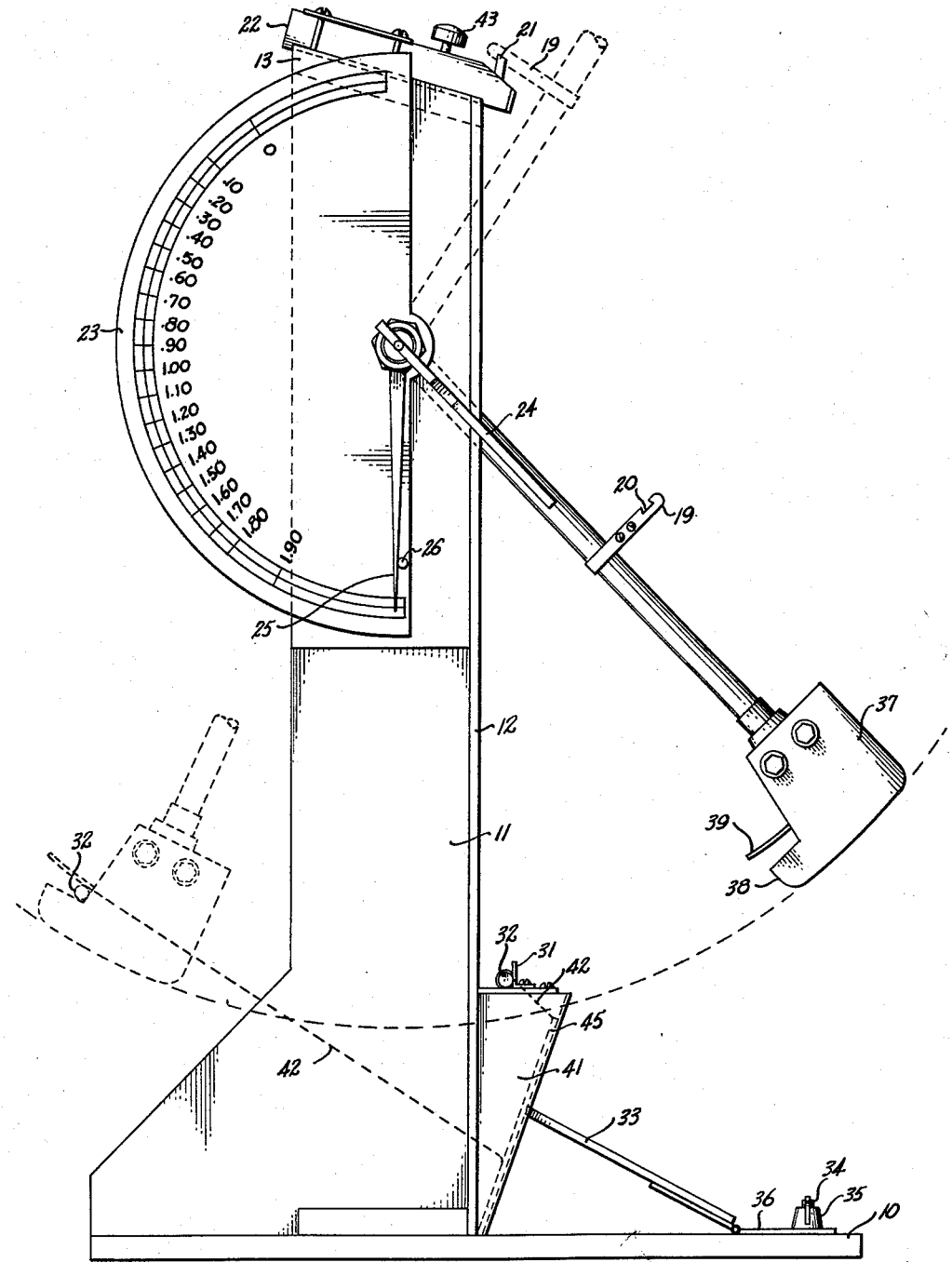
FIGURE 1 is a schematic side view of the adherence tester.
Figure 2:
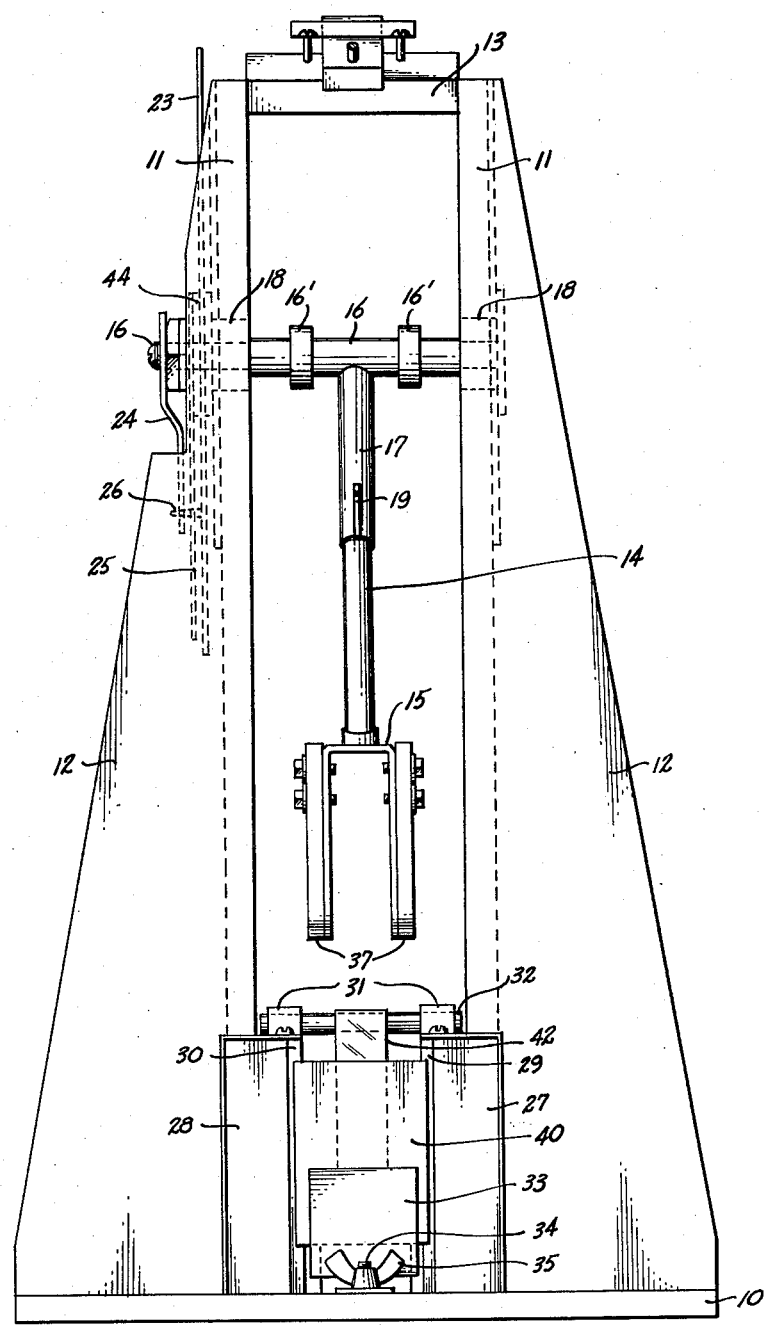
FIGURE 2 is a schematic end view of the tester.

As seen in FIGURES 1 and 2 the apparatus of the present invention includes a base plate 10 having attached thereto vertically disposed parallel and spaced apart frame members 11 and frame gusset members 12. The frame members 11 are joined at the top by a cross frame brace 13 which supplies rigidity to the frame and support for a pendulum locking means and lock release means to be described below. A pendulum 14 is suspended between frame members 11 on shaft 16 by means of rod connector 17, forming a T connection therewith. Shaft 16 is split on either side of the T connection in order to facilitate removal of the pendulum. At each point of such split in shaft 16 a sliding collar 16' is fixed to the two sections of shaft 16 by an Allen screw, thus rigidly connecting the two end sections with the center section of shaft 16. The shaft 16 is rotatably supported in frame members 11 by means of roller bearings 18 extending through said frame members 11. The free end of the pendulum 14 comprises an inverted U-shaped yoke 15 having attached to each of its legs a side plate 37 which has a forwardly disposed protruding section forming a rigid jaw member 38. Above the said jaw member 38 and spaced therefrom is a spring jaw member 39 which is held in position by inserting one end thereof in a hole in the forward edge of side plates 37 adapted to receive and hold said spring jaw member 39.

An arm 19 is mounted on the rear side of pendulum rod 17 and is so positioned thereon that an indent 20 provided in the free end of said arm 19 will engage detent 21, thus locking the pendulum 14 to a pendulum holding and releasing member 22 mounted on the top cross frame brace 13 when the pendulum 14 is swung upwardly in a vertical plane to a starting position which is approximately 160° from the zero position of the pendulum when freely swinging. Slidably mounted on shaft 16 and fixed with respect to the frame 11 is a gauge 23 having inscribed thereon a scale calibrated to read the loss in residual energy of pendulum 14. Fixedly mounted on shaft 16 rotatable therewith is striker arm 24. Mounted to rotate about shaft 16 is an indicator arm 25 carrying a protruding pin 26. The indicator arm has a constant friction, maintained by a spring washer 44, sufficient to hold it in any position to which it may be rotated.

Mounted on base plate 10 and attached to gusset members 12 rearwardly disposed with respect thereto is a test positioning member 41 including two angularly extending separated arms 27 and 28 with inwardly extending shoulders 29 and 30. Mounted on top the angularly extending arms 27 and 28 are angle detents 31 preventing backward movement of a pin 32 supported by and spanning the arms 27 and 28. A holding arm 33 is adjustably attached to base plate 10 by bolt 34 and wing nut 35 connected through a diagonally extending slot in a hinge 36.

In using this apparatus for carrying out the method of this invention, a strip of adhesive tape 42 is applied to and extends beyond the painted surface of a hardboard test piece 45. Uniform contact of the adhesive tape with the test surface is insured by application of a pressure at least equal to 10 p.s.i. of tape. With pendulum 14 held locked in its top vertical position, as shown in the upper dotted outline form in FIGURE 1, the test sample 45 is placed in the positioning member 41 and pressed firmly against shoulders 29 and 30 by arm 33, with the tape side to the left as viewed in FIGURE 1. An extended portion of the adhesive tape strip 42 is secured to pin 32. Pendulum 14 is released from its top vertical position by depressing knob 43 of the releasing and holding mechanism 22 which disengages locking member 21 from indent 20 permitting free fall of the pendulum. As the pendulum reaches its zero position, rigid jaw members 38 and spring jaw members 39 cooperate to remove and carry forward pin 32 stripping the tape 42, with or without paint from the test sample 45, as shown in the lower dotted outline form in FIGURE 1, while at the same time striker arm 24 contacts pin 26 and moves indicator arm 25 along the inscribed scale to a position determined by the residual energy of the pendulum. The friction maintained by the spring washer 44 holds the indicator arm in the new position until manually returned to the starting position. The inscribed scale of gauge 23 is calibrated so as to record the energy absorbed in removing the tape and, in the embodiment described below, is based on a falling pendulum possessing 2 foot pounds of potential energy.

During development of the method of the present invention it was discovered that the most desirable angle of tape removal is 90° to the surface of the hardboard sample. In one embodiment of the invention using test samples of hardboard 3 inches by 5 inches, the bottom of the positioning member 41 is placed at an angle of 23° from the vertical providing a tape removal angle varying from 71° to 106°.

A series of studies using the method and apparatus described heretofore and employing a transparent cellophane pressure sensitive adhesive tape, ¾ inch in width, sold by Minnesota Mining and Manufacturing Company of St. Paul, Minnesota, and identified as "Scotch Brand" Tape #600, gave the correlation between energy absorbed and paint removal as shown by the values recorded in Table I, wherein the test specimens are hardboard with a uniform surface coating of a latex base flat coat paint and the tape was applied with a pressure of 20 p.s.i. by means of a hydraulic press.

*Table I*

| Energy absorbed, ft. lbs. | 1.3 | 1.1 | 0.9 | 0.7 | 0.5 | 0.3 | 0.1 |
|---|---|---|---|---|---|---|---|
| Percent paint removed | 0 | 17 | 33 | 48 | 62 | 78 | 92 |

It is to be understood that the above described arrangements are illustrative of the application of the principles of the invention which is not limited to the use of any particular testing tape or any particle surface coated articles. Likewise numerous other arrangements may be readily devised which will employ the principles of the invention and fall within the spirit and scope of the invention as expressed in the following claims.

What we claim as new and desire to secure by Letters Patent is:

1. The method of determining the adherence of a coating bonded to a surface comprising uniformly applying an extended pressure sensitive adhesive strip with a pressure of at least 10 p.s.i. on said adhesive strip to the surface bonded coating, applying an impact force of predetermined kinetic energy to the extended portion of said adhesive strip at an angle in the range of about 70° to about 110° to said surface, thereby to suddenly remove the adhesive strip from the bonded coating, and measuring the residual energy of the impact force.

2. An apparatus for determining the adherence of a coating bonded to a rigid surface comprising in combination a pendulum attached to a shaft rotatably supported by a frame mounted on a base member, vertically mounted means disposed adjacent to and below the zero position of said pendulum for positioning a surface coated test article having an extended adhesive strip attached thereto, separate means supported by said positioning means for attachment to the extended portion of said adhesive strip, means attached to said pendulum for engagement with and removal of said separate means from said positioning means, and associated means for measuring the residual energy of said pendulum.

3. The apparatus of claim 2 in which said positioning means is disposed forwardly of said pendulum zero position.

4. An apparatus for determining the adherence of a coating bonded to a rigid surface comprising in combination a pendulum attached to a shaft rotatably mounted in bearings supported by a frame attached to a base member, releasable holding means attached to said frame and disposed to hold said pendulum in a substantially near vertical upright position until released, vertically mounted means disposed adjacent to and below the zero portion of said pendulum for positioning a surface coated test sample having an extended adhesive strip applied thereto, adjustable means mounted on said base and adjacent to said positioning means for holding said article in position, separate means supported by said positioning means for attachment to the extended portion of said adhesive strip, means attached to said pendulum to engage and carry said separate means and attached tape whereby said tape is removed from said article, and means to measure the residual energy of the pendulum.

References Cited in the file of this patent
UNITED STATES PATENTS

| | | |
|---|---|---|
| 1,447,185 | Sammet | Mar. 6, 1923 |
| 1,935,752 | Sward | Nov. 21, 1933 |
| 2,051,464 | Bradner et al. | Aug. 18, 1936 |
| 2,518,350 | McCormick | Aug. 8, 1950 |
| 2,752,780 | Gershberg | July 3, 1956 |
| 2,778,219 | Wachter | Jan. 22, 1957 |
| 2,834,205 | Pickup | May 13, 1958 |
| 2,971,374 | Rendel | Feb. 14, 1961 |
| 3,019,644 | Mancini | Feb. 6, 1962 |